Apr. 10, 1923.
H. DE F. HILLIARD
SHOCK ABSORBER FOR AUTOMOBILES
Filed June 17, 1920
1,451,509
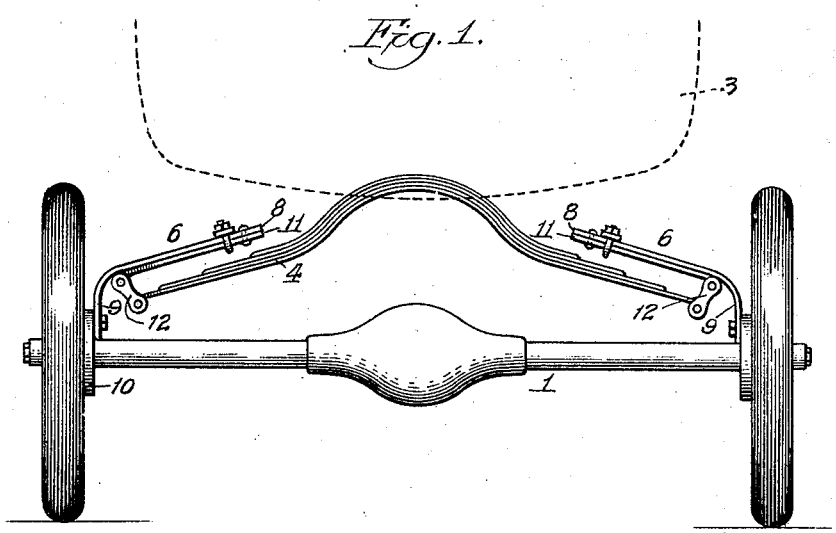
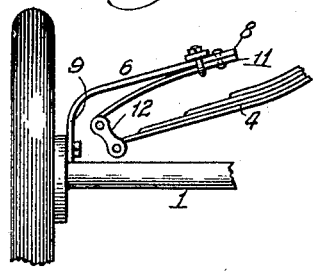
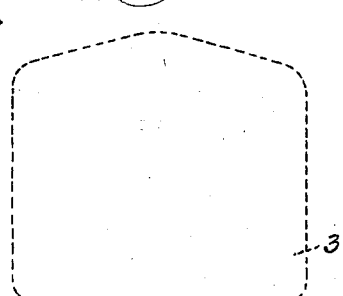
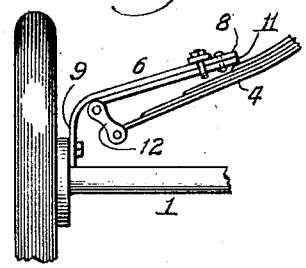
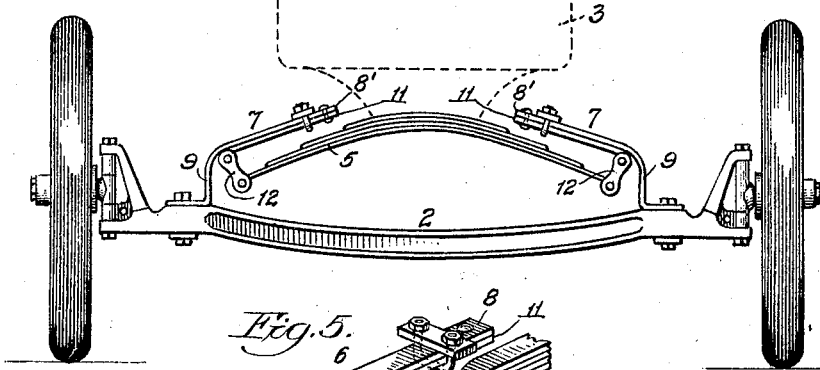
Witness:
John Onders
Inventor:
Harry De F. Hilliard
by
Wallace R. Lane
Atty.

Patented Apr. 10, 1923.

1,451,509

UNITED STATES PATENT OFFICE.

HARRY De F. HILLIARD, OF CHICAGO, ILLINOIS, ASSIGNOR, BY MESNE ASSIGNMENTS, TO H-R MANUFACTURING COMPANY, OF CHICAGO, ILLINOIS, A CORPORATION OF ILLINOIS.

SHOCK ABSORBER FOR AUTOMOBILES.

Application filed June 17, 1920. Serial No. 389,577.

*To all whom it may concern:*

Be it known that I, HARRY DE F. HILLIARD, a citizen of the United States, residing at Chicago, county of Cook, and State of Illinois, have invented certain new and useful Improvements in Shock Absorbers for Automobiles, of which the following is a specification.

This invention relates to a shock absorber adapted to be inserted between the automobile springs and the running gear to increase the shock absorption of the former and to reduce the amount of recoil due to sudden and great shocks to which the springs are often subjected during use.

Among the objects of my invention are to provide a device whereby the amount of jolt received by occupants of an automobile when one or more wheels thereof strike an obstruction in the roadway is reduced to the minimum; to provide an improved device of the character stated adapted to materially reduce the recoil of the automobile springs, after the wheels have struck an obstruction or dropped into a depression in the roadway; and such further objects, advantages, and capabilities as will later more fully appear.

My invention further resides in the combination, construction and arrangement of parts illustrated in the accompanying drawing, and while I have shown therein a preferred embodiment, I desire the same to be understood as illustrative only and not as limiting my invention.

In the accompanying drawing, illustrating my invention, Fig. 1 is a rear view of the rear portion of the running gear and the rear body supporting spring of an automobile, Fig. 2 is a similar view showing the front portion of the running gear and the front body supporting spring, Fig. 3 is a fragmentary view similar to Fig. 1, but showing the position of the members under stress, Fig. 4 is similar to Fig. 3, but shows the parts in the positions occupied during recoil of the springs, and Fig. 5 is a perspective view of a rear shock absorber and an end of a rear spring.

Referring more in detail to the drawing, numeral 1 designates the rear axle, 2 the front axle, 3 the body in general, and 4 and 5 the rear and front body supporting springs, respectively, of an automobile.

My invention comprises rear and front shock absorbers 6 and 7, respectively, adapted to be inserted between the springs and running gear of the automobile. These shock absorbers comprise two resilient members, either or both of which may be made up of one or more leaf springs, but in this description they will be considered as each consisting of a single member. The upper member 8 of shock absorber 6 is substantially straight throughout the greater portion of its length, but has one end curved laterally as shown at 9, this end being perforated for attachment to the emergency brake casing 10 of the rear wheel. The lower member 11 of this shock absorber is substantially straight throughout its length, being rigidly secured at one end to member 8 and being apertured at its remaining end for attachment to the spring shackle 12 of the automobile. The means shown for securing these resilient members together comprises a rivet passing through a perforation in the end of these members and a yoke member passing around them, to hold them rigidly together.

The shock absorber 7 is essentially like 6 except that the perforated end portion of the curved end of resilient member 8' is bent laterally at an angle to adapt it to be attached to the axle 2 of the machine.

It will be seen from the foregoing description and from Fig. 3, that when an obstruction or rut causes the body of the automobile to go downwardly, with respect to the axle, the ends of members 8 and 11 which are not secured together will separate as shown, the lower member being concaved downwardly, and the upper member concaved upwardly. When the springs recoil the parts 8 and 11 will be in contact as shown in Fig. 4, and the automobile spring, 4 or 5, will rise and engage the inner end of the shock absorber 6 or 7. It will thus be seen that the inner ends of the shock absorbers furnish resilient means for retarding the upward motion of the springs during recoil thereof.

It is believed that the construction and operation of the specific embodiment of my device shown is clear from the above description taken in connection with the annexed drawing. It is, of course, understood that the specific description of structure set forth above may be departed from without departing from the spirit of my invention as set forth in this specification and the appended claims.

Having now described my invention, I claim:

1. In an automobile having a running gear and body supporting springs, a resilient element connecting the said running gear and an end of one of the springs, said resilient element comprising a pair of resilient members secured together at one end, the free end of one of said members being secured to the spring and the free end of the other being bent and rigidly secured to the said running gear, the last mentioned member acting as a shock absorber to check the recoil of the other member and the springs connected thereto.

2. In an automobile having a running gear and body supporting springs, the combination of a resilient member having a substantially straight portion and a bent end portion rigidly secured to the running gear, and a second resilient member underslung from the first named member and rigidly secured adjacent one end to the straight portion thereof and pivotally secured at its opposite end to a spring shackle, said underslung member adapted to approach and be checked by the first named member upon recoil of the springs of the automobile, the means for securing the resilient elements together comprising a rivet passing through said members and a yoke passing around them.

3. In a shock absorber, a pair of members resilient throughout their length, one of said members being curved and perforated adjacent one end for attachment to the emergency brake housing, the other resilient member having an aperture at one end for attachment to a spring shackle, said last named resilient member underlying the first named member, said first named member acting as a shock absorber to check the recoil of the springs attached to the underlying member, said two members having their remaining ends rigidly secured together.

4. In a shock absorber, a pair of members resilient throughout their length, one of said members being curved and having one end perforated and bent laterally at an angle to adapt it for attachment to an automobile axle, the other resilient member having an aperture at one end for attachment to a spring shackle, said last named resilient member underlying the first named member, said two members having their remaining ends rigidly secured together, the free end of the shock absorber overlying the automobile spring, and the arrangement of the parts being such that the shock absorber serves to check the recoil of the spring by engagement therewith as the spring rises.

5. In an automobile having a running gear and body supporting springs, a pair of auxiliary springs connected between said gear and said body supporting springs, said auxiliary springs being secured together at one end thereof, the free end of one of said auxiliary springs being rigidly fastened to said runing gear and the free end of the other auxiliary spring being pivotally connected to said body supporting spring, said auxiliary springs separating upon compression of the body supporting springs, and approaching each other to act as a shock absorber to recoil action of the body supporting spring.

6. In an automobile having a running gear and body supporting springs, a pair of auxiliary springs connected between said running gear and said body supporting springs, said auxiliary springs being secured together at one end thereof, one of said auxiliary springs being L-shaped and having its bent end rigidly fastened to said running gear, and the free end of the other auxiliary spring being pivotally connected to said body supporting springs, said auxiliary springs separating upon compression of the body supporting springs, and approaching each other to act as a shock absorber to recoil action of the body supporting spring.

In witness whereof, I hereunto subscribe my name to this specification.

HARRY De F. HILLIARD.